US012490330B2

(12) United States Patent
Telang et al.

(10) Patent No.: US 12,490,330 B2
(45) Date of Patent: Dec. 2, 2025

(54) OUT-OF-SERVICE SCANNING FOR PAIRED RADIO DEVICES

(71) Applicant: GOOGLE LLC, Mountain View, CA (US)

(72) Inventors: Mahesh Devdatta Telang, San Jose, CA (US); Shivank Nayak, Milpitas, CA (US)

(73) Assignee: GOOGLE LLC, Mountain View, CA (US)

( * ) Notice: Subject to any disclaimer, the term of this patent is extended or adjusted under 35 U.S.C. 154(b) by 690 days.

(21) Appl. No.: 17/867,857

(22) Filed: Jul. 19, 2022

(65) Prior Publication Data

US 2022/0369406 A1     Nov. 17, 2022

Related U.S. Application Data

(63) Continuation of application No. PCT/US2021/031958, filed on May 12, 2021.

(51) Int. Cl.
*H04W 76/18* (2018.01)
*H04B 17/318* (2015.01)
(Continued)

(52) U.S. Cl.
CPC .......... *H04W 76/18* (2018.02); *H04B 17/318* (2015.01); *H04W 72/0453* (2013.01); *H04W 72/54* (2023.01); *H04W 76/15* (2018.02)

(58) Field of Classification Search
CPC . H04W 76/18; H04W 72/54; H04W 72/0453; H04B 17/15; H04B 17/318
See application file for complete search history.

(56) References Cited

U.S. PATENT DOCUMENTS

2013/0344902 A1    12/2013   Cili et al.
2015/0282110 A1*  10/2015   Hwang ............... H04B 5/77
                                                               455/456.1
(Continued)

FOREIGN PATENT DOCUMENTS

WO         2020159481 A1      8/2020
WO    WO-2020263269 A1 *  12/2020  ............ H04W 24/02

OTHER PUBLICATIONS

International Search Report and Written Opinion mailed Feb. 8, 2022 for PCT/US2021/031958, 13 pages.
(Continued)

*Primary Examiner* — Joseph E Avellino
*Assistant Examiner* — Maryam Emadi (57) ABSTRACT

A first user equipment (UE) that is initially coupled to a second UE and a base station enters an out-of-service (OOS) state upon losing its wireless connection to a service via the base station. The first UE attempts to reestablish the connection while sending OOS recovery parameters to the second UE. The second UE does not automatically scan for service if a signal strength of its connection to the first UE is above a predetermined threshold level. In response to losing its connection to the first UE or determining that the signal strength of its connection to the first UE is less than the predetermined threshold level, the second UE activates one or more corresponding modems and executes OOS recovery protocols based on the OOS recovery parameters received from the first UE to attempt to regain service.

23 Claims, 5 Drawing Sheets

(51) Int. Cl.
*H04W 72/0453* (2023.01)
*H04W 72/54* (2023.01)
*H04W 76/15* (2018.01)

(56) References Cited

U.S. PATENT DOCUMENTS

2017/0353990 A1* 12/2017 Nair ..................... H04W 76/19
2018/0137800 A1    5/2018 Cheng
2018/0160256 A1*  6/2018 Khanduri ................ H04W 4/80
2018/0184293 A1    6/2018 Wozniak et al.
2019/0182775 A1*  6/2019 Palo ..................... H04W 52/50
2019/0372708 A1   12/2019 Singh et al.
2020/0245232 A1    7/2020 Yeh et al.
2020/0367159 A1* 11/2020 Kolli ..................... H04W 68/02

OTHER PUBLICATIONS

International Preliminary Report on Patentability mailed Nov. 23, 2023 for PCT/US2021/031958, 10 pages.
European Notice of Allowance dated Mar. 6, 2025 for EP Application No. 21730034.2, 37 pages.

* cited by examiner

OUT-OF-SERVICE SCANNING FOR PAIRED RADIO DEVICES

CROSS-REFERENCE TO RELATED APPLICATIONS

The present application is a continuation application of International Application No. PCT/US2021/031958, entitled "OUT-OF-SERVICE SCANNING FOR PAIRED RADIO DEVICES" and filed on May 12, 2021, the entirety of which is incorporated by reference herein.

BACKGROUND

Wireless communication systems often employ various techniques to facilitate communication between mobile user equipment (UE) and associated base stations (BSs). At times, a UE can become disconnected from its associated BSs, such as when UE enters an area in which such BSs are unable to provide service (e.g., sufficient wireless signal strength). This is sometimes referred to as the UE going into an out-of-service (OOS) state. In the OOS state, the UE will typically attempt to reestablish a connection to one or more of its associated BSs by scanning associated frequencies. Upon identifying a valid wireless signal during scanning, the UE can return to an in-service (IS) state by reestablishing a connection to a BS via the valid wireless signal.

UEs, such as smartphones, smartwatches, and tablets, are commonly able to connect to one or more wireless networks, such as those implemented by employing Third Generation Partnership Project (3GPP), Fourth Generation (4G), Long Term Evolution (LTE), and Fifth Generation (5G) New Radio (NR) radio access technologies (RATs), via connections with one or more associated BSs. A UE can obtain both data services and voice services via its connection to such wireless networks. When a UE that is connected to a wireless network exits the service area of the BSs that provide access to the wireless network, the UE enters an OOS state. Conventionally, when in the OOS state, the UE repeatedly scans one or more frequencies to find a valid wireless signal that will allow the UE to reestablish its connection to the wireless network—a process sometimes referred to as "scanning for service." The UE typically continues to scan for service until a valid wireless signal is found, at which time the UE reestablishes its connection to the wireless network via the valid wireless signal—a process sometimes referred to as "acquiring service." In some embodiments, the UE scans for service across multiple RATs (e.g., any of 3GPP, 4G, LTE, or 5G NR).

SUMMARY

In an example aspect, a method includes steps of receiving, from a first user equipment (UE) by a second UE responsive to the first UE entering an out-of-service (OOS) state, at least one OOS recovery parameter via a wireless personal area network (WPAN) connection, and scanning, by the second UE, a plurality of frequency bands for service based on the at least one OOS recovery parameter.

In some embodiments, the method further includes a step of determining, by the second UE, that a signal strength of the WPAN connection is below a predetermined threshold level, where scanning the plurality of frequency bands for service further includes scanning, by the second UE responsive to determining that the signal strength of the WPAN connection is below the predetermined threshold level, the plurality of frequency bands for service based on the at least one OOS recovery parameter, at least a subset of the plurality of frequency bands corresponding to a first RAT.

In some embodiments, the method further includes a step of determining, by the second UE, that the WPAN connection has been lost, where scanning the plurality of frequency bands for service further includes scanning, by the second UE responsive to determining that the WPAN connection has been lost, the plurality of frequency bands for service based on the at least one OOS recovery parameter, at least a subset of the plurality of frequency bands corresponding to a first RAT.

In some embodiments, the method further includes a step of disabling, by the second UE, communications of the second UE via the first RAT while the first UE is in an OOS state and while the signal strength of the WPAN connection is above the predetermined threshold level.

In some embodiments, the method further includes a step of executing, by the second UE, at least one OOS recovery protocol to determine a scan ratio. The scan ratio defines, for a given time period, a scan duration in which the second UE scans for service and a sleep duration in which the second UE does not scan for service.

In some embodiments, the at least one OOS recovery parameter includes a timer value indicative of a duration of the OOS state of the first UE, and the OOS recovery protocol determines the scan ratio based, at least in part, on the timer value.

In some embodiments, the at least one OOS recovery parameter includes a ping-pong rate indicative of a rate at which the first UE has changed between the OOS state and an IS state, and the OOS recovery protocol determines the scan ratio based, at least in part, on the ping-pong rate.

In another example aspect, a UE includes at least one modem configured to communicate using at least one RAT, and at least one processor configured to receive at least one OOS recovery parameter from a device to which the UE is connected and scan for service using the at least one modem based on the at least one OOS recovery parameter.

In some embodiments, the at least one processor is further configured to activate the at least one modem to scan for service responsive to determining that a signal strength of a connection between the UE and the device is less than a predetermined threshold level.

In some embodiments, the at least one processor is further configured to deactivate the at least one modem responsive to determining that the signal strength is above the predetermined threshold level.

In some embodiments, the at least one processor is further configured to execute at least one OOS recovery protocol to determine a scan ratio. The scan ratio defines, for a given time period, a scan duration in which the UE scans for service using the at least one modem and a sleep duration in which the UE does not scan for service.

In some embodiments, the at least one OOS recovery parameter includes a timer value indicative of a duration of an OOS state of the device, and the OOS recovery protocol determines the scan ratio based, at least in part, on the timer value.

In some embodiments, the at least one OOS recovery parameter comprises a ping-pong rate indicative of a rate at which the device has changed between an OOS state and an IS state, and the OOS recovery protocol determines the scan ratio based, at least in part, on the ping-pong rate.

In another example aspect, a system includes a first UE that is in an OOS state with respect to a first radio access technology (RAT) and that is configured to output at least one OOS recovery parameter while in the OOS state and a second UE that is coupled to the first UE via a WPAN connection and that is configured to receive the at least one OOS recovery parameter from the first UE and scan for service based on the at least one OOS recovery parameter.

In some embodiments, the second UE is configured to activate at least one modem associated with the first RAT to scan for service responsive to determining that a signal strength of the WPAN connection is less than a predetermined threshold level.

In some embodiments, the second UE is configured to deactivate at least one modem associated with the first RAT to scan for service responsive to determining that a signal strength of the WPAN connection is above the predetermined threshold level.

In some embodiments, the second UE is configured to activate at least one modem associated with the first RAT to scan for service responsive to determining that the WPAN connection to the first UE has been lost.

In some embodiments, the second UE is configured to execute at least one OOS recovery protocol to determine a scan ratio, wherein the scan ratio defines, for a given time period, a scan duration in which the second UE scans for service and a sleep duration in which the second UE does not scan for service.

In some embodiments, the at least one OOS recovery parameter comprises a timer value indicative of a duration of the OOS state of the first UE, and the OOS recovery protocol determines the scan ratio based, at least in part, on the timer value.

In some embodiments, the at least one OOS recovery parameter comprises a ping-pong rate indicative of a rate at which the device has changed between an OOS state and an IS state, and the OOS recovery protocol determines the scan ratio based, at least in part, on the ping-pong rate.

In another example aspect, a UE includes at least one modem configured to communicate using at least one RAT and at least one processor configured to scan for service using the at least one modem responsive to the UE entering an OOS state and transmit, responsive to scanning for service in the OOS state, at least one OOS recovery parameter to a device to which the UE is connected.

In some embodiments, the at least one OOS recovery parameter comprises a timer value indicative of a duration of the OOS state of the UE, the at least one processor is further configured to execute an OOS recovery protocol that determines a scan ratio for the UE based, at least in part, on the timer value, and the scan ratio defines, for a given time period, a scan duration in which the UE scans for service using the at least one modem and a sleep duration in which the UE does not scan for service.

In some embodiments, the at least one OOS recovery parameter includes a ping-pong rate indicative of a rate at which the UE has changed between the OOS state and an IS state, the at least one processor is further configured to execute an OOS recovery protocol that determines a scan ratio for the UE based, at least in part, on the ping-pong rate, and the scan ratio defines, for a given time period, a scan duration in which the UE scans for service using the at least one modem and a sleep duration in which the UE does not scan for service.

In another example aspect, a computer program product comprises a set of instructions which, when executed on an apparatus, is configured to cause the apparatus to carry out the method of any preceding method definition.

In another example aspect, a non-transitory computer readable medium comprises program instructions stored thereon for performing a method of any preceding method definition.

BRIEF DESCRIPTION OF THE DRAWINGS

The present disclosure may be better understood, and its numerous features and advantages made apparent to those skilled in the art, by referencing the accompanying drawings. The use of the same reference symbols in different drawings indicates similar or identical items.

DETAILED DESCRIPTION

FIGS. 1-5 illustrate example systems and techniques by which power consumption of two connected UEs in an OOS state can be reduced by only using the first UE to scan for service, while the second UE does not scan for service (e.g., by disabling one or more modems of the second UE associated with the RAT or RATs being scanned). In some embodiments, the first UE may transmit OOS recovery parameters to the second UE via a wireless personal area network (WPAN), allowing the second UE to continue scanning for service in the instance that the second UE becomes unpaired from the first UE, or a signal strength of the WPAN connection between the first and second UEs becomes marginal.

In some scenarios, two UEs that are both configured for wireless communication with at least one radio access network (RAN) via at least a first RAT (e.g., 3GPP, 4G, LTE, or 5G NR) are connected to one another via a WPAN connection using a wireless technology standard such as Bluetooth. In such scenarios, a first UE (e.g., a smartphone) of the two UEs may maintain a connection to the RAN via the first RAT, while the second UE (e.g., a smartwatch) of the two UEs is tethered to the first UE and operates in a tethering mode. In the tethering mode, the second UE disables one or more modems associated with first RAT communications and instead acquires data or voice services from the first network via its WPAN connection to the first UE. Routing data and voice services to the second UE via the first UE and the WPAN connection in this way generally reduces power consumption of the second UE. However, if the first UE loses its connection to the wireless network while still connected to the second UE, both the first UE and the second UE will, in conventional systems, begin scanning for service, which undesirably results in higher power consumption at both the first and second UEs.

In some embodiments, the first UE shares one or more OOS recovery parameters (e.g., scan patterns, timers, counters, ping-pong rates, and/or the like) with the second UE so that, in the event the first and second UEs become disconnected or the signal strength between the first and second UEs becomes marginal, the second UE can continue scanning for service (e.g., while executing corresponding OOS recovery protocols) based on the OOS recovery parameters of the first UE. That is, sending the OOS recovery parameters from the first UE to the second UE while the first and second UEs are connected provides at least some continuity between OOS recovery activities performed by the first UE and subsequent OOS recovery activities performed by the second UE.

For example, when scanning for service, a given UE uses significantly more power (e.g., as much as 10 times more power) than when the UE is in an otherwise idle state. For UEs with limited power supplies (e.g., battery-powered devices such as smartphones, tablets, or smart watches), it is therefore not feasible for such UEs to continuously scan for service. To reduce the power consumption associated with service acquisition, a UE in the OOS state may only scan for service during a portion of a given time period and remain in an idle state (e.g., a sleep state) for the remainder of that time period. While a UE is in the OOS state, the ratio of the amount of time that the UE scans for service to the amount of time that the UE spends in the idle state is referred to herein as the "scan ratio" of the UE. As will be described, a UE may implement an OOS recovery protocol to dynamically set the scan ratio based on the one or more OOS recovery parameters.

Figure 1:
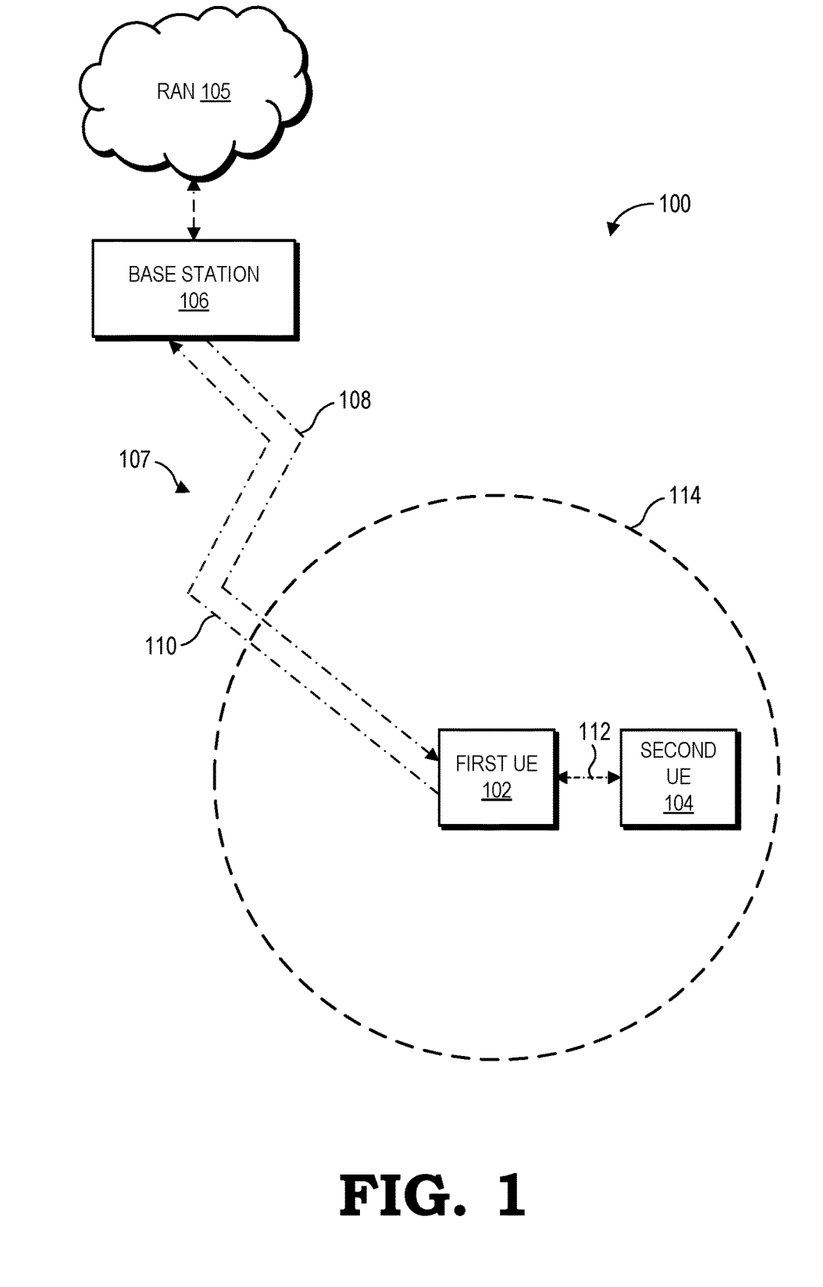
FIG. 1 is a block diagram of an example wireless communication network having a first UE that is wirelessly coupled to a second UE and a BS in accordance with some embodiments.

FIG. 1 illustrates a block diagram of an embodiment of a wireless communication network 100 in which a first UE 102 is communicatively coupled to a second UE 104 and to a RAN 105 via a BS 106. In the present example, the first UE 102 is communicatively coupled to the BS 106 via a wireless network connection 107 using a first RAT (e.g., 3GPP, 4G, LTE, or 5G NR), the wireless network connection 107 shown at FIG. 1 to include a downlink connection 108 and an uplink connection 110. The first UE 102 is also communicatively coupled to the second UE 104 via a WPAN connection 112 using a wireless technology standard such as Bluetooth.

In some embodiments, the first UE 102 is a mobile communications device, such as a smartphone or tablet, while the second UE 104 is a smartwatch. Both the first UE 102 and the second UE 104 are capable of communicating with the RAN 105 using the first RAT. However, in the present example, upon connecting to the first UE 102 via the WPAN connection 112 (i.e., upon being tethered to the first UE 102), the second UE 104 disables one or more modems associated with first RAT communications and instead routes all of its data and voice call activity via the WPAN connection 112, the first UE 102, and the wireless network connection 107 to the BS 106. For example, data (e.g., data corresponding to voice services, data services, or OOS recovery parameters) transmitted between the first UE 102 and the second UE 104 via the WPAN connection 112 may be included in the protocol data unit (PDU) of a WPAN packet (e.g., a Bluetooth packet), with the encoding, transmission, and decoding of the WPAN packet being performed according to conventional techniques.

A boundary 114 is shown centered around the first UE 102, representing the range within which the first UE 102 can maintain its connection to the second UE 104 via the WPAN connection 112 (i.e., the range within which the second UE 104 can remain tethered to the first UE 102). That is, if the second UE 104 exits the boundary 114, the signal strength of the connection between the first UE 102 and the second UE 104 will diminish so that the WPAN connection 112 will be lost. While the boundary 114 is shown here as being uniform and circular, it should be understood that the illustrated shape of the boundary 114 is intended to be illustrative, not limiting, and could instead take other non-circular or non-uniform shapes (e.g., due to interference from objects in the immediate environment of the first UE 102).

As described further below, when the first UE 102 becomes disconnected from the BS 106 and the RAN 105, the first UE 102 enters an OOS state. In the OOS state, the first UE 102 sends one or more OOS recovery parameters to the second UE 102 while the WPAN connection 112 is maintained. In some embodiments, the first UE 102 sends one or more of the OOS recovery parameters to the second UE 104 periodically. In some embodiments, the first UE 102 sends one or more of the OOS recovery parameters to the second UE 104 as the respective values of such OOS recovery parameters are updated (e.g., in the case of the ping-pong rate described below, which is updated as the first UE 102 switches between OOS and IS states). The second UE 104 uses the OOS recovery parameters provided by the first UE 102 to execute one or more OOS recovery protocols upon being disconnected from the first UE 102 or responsive to determining that the signal strength of the WPAN connection 112 is less than a predetermined threshold level. In this way, continuity is provided between OOS recovery activities of the first UE 102 and subsequent OOS recovery activities of the second UE 104, which may advantageously decrease power consumption of the second UE 104 during OOS recovery, for example.

Figure 2:
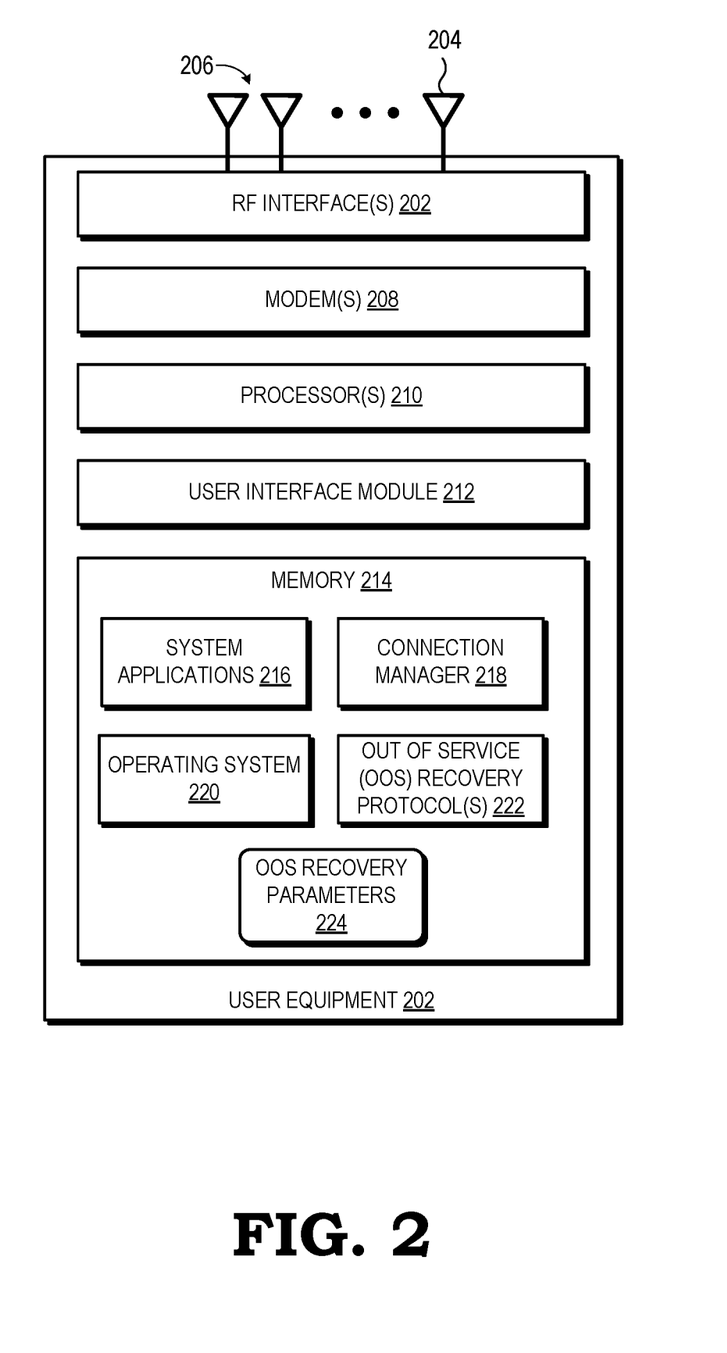
FIG. 2 is a block diagram of an example UE, which may correspond to an embodiment of the first UE or the second UE of FIG. 1, in accordance with some embodiments.

FIG. 2 illustrates an example configuration of a UE 202, which may correspond to an embodiment of either of the first UE 102 and the second UE 104 of the wireless communication network 100 of FIG. 1, in accordance with some embodiments. In the depicted configuration, the UE 202 includes, for each RAT, a radio frequency (RF) interface 202, one or more antenna arrays 206, each having one or more antennas 204, and a corresponding modem of the modem(s) 208. For example, for wireless communications, the UE 202 may include a set of one or more antenna arrays 206, one or more RF interface(s) 202, and one or more modem(s) 208 to support 4G LTE or 5G NR signaling with the BS 106.

The UE 202 further includes one or more processors 210 and at least one memory 214 (e.g., which may include one or more non-transitory computer-readable media). The one or more processors 210 can include, for example, one or more central processing units (CPUs), graphics processing units (GPUs), artificial intelligence (AI) accelerators or other application-specific integrated circuits (ASICs), and the like. The memory 214 can include any of a variety of media used by electronic devices to store data and/or executable instructions, such as random access memory (RAM), read-only memory (ROM), caches, Flash memory, solid-state drive (SSD) or other mass-storage devices, and the like. For ease of illustration and brevity, the term "memory" is used to refer to the "memory 214", but it will be understood that reference to "memory 214" shall apply equally to other types of storage media unless otherwise noted.

The UE 202 further includes a user interface module 212. The user interface module 212 can be configured to receive inputs from a user of the UE 202. The user interface module 212 can include a graphical user interface (GUI) that receives the input information via a touch input. In other instances, the user interface 212 includes an intelligent assistant that receives the input information via an audible input. For example, a user may provide inputs via the user interface module 212 to manually enable or disable one or more of the modems 208.

The memory 214 is used to store one or more software applications in the form of sets of executable software instructions and associated data that manipulate the one or more processors 210, modems 208, RF interfaces 202, user interface module 212, and other components of the UE 202 to perform the various functions described herein and attributed to the UE 202. The software includes, for example, one or more system applications 216, a connection manager 218, an operating system 220, and one or more OOS recovery protocols 222.

The system applications 216 may include a system manager, such as any form of a control application, software application, signal-processing and control module, code that is native to a particular device, an abstraction module or gesture module, and the like. The system applications 216 may also include system components and utilities associated with implementing OOS recovery functions, such as the connection manager 218 and the OOS recovery protocols 222.

The connection manager 218 manages or directs the UE 202 in utilizing one or more connections for communication with a base station, such as an embodiment of the BS 106 of FIG. 1. The connection manager 218 may include, be coupled with, or have access to components for measuring characteristics of a connection, scanning for service, receiving connection parameters from the base station, acquiring a connection, releasing a connection, or the like. In various aspects of adaptive connection management, the connection manager 218 may also alter connection parameters, such as to reduce data activity associated with a connection or prevent the acquisition of a connection.

The UE 202 executes the OOS recovery protocols 222 when scanning for service during the OOS state. As explained above, a tradeoff exists between power consumption in scanning for service and delay in service acquisition (e.g., based on how frequently the UE performs scans). One or more of the OOS recovery protocols 222 may determine the scan ratio of the UE 202, setting, for a given time period, a first amount of time during which the UE 202 is to scan for service and a second amount of time during which the UE 202 is not to scan for service. In some embodiments, when the UE 202 is not scanning for service during such a time period, the UE 202 may remain in a sleep mode.

For example, one of the OOS recovery protocols 222 executed by the UE 202 may be an incremental sleep algorithm that causes the UE 202 to perform scans for service less frequently as the amount of time during which the UE 202 has remained in the current OOS state (referred to herein as the "OOS time") increases. The UE 202 may keep track of the amount of time that has passed while in the current OOS state using one or more timers or counters, for example. The incremental sleep algorithm may set a sleep duration based on such timers or counters, the sleep duration defining the amount of time that is to elapse between scans for service performed by the UE 202. The incremental sleep algorithm may increase the sleep duration as the OOS time increases.

As another example, the OOS recovery protocols 244 may include a ping-pong rate-based OOS recovery protocol for adjusting the scan ratio used by the UE 202 when scanning for service based on the extent to which a UE 202 is frequently going in and out of service. For example, the UE 202 may determine a ping-pong rate that is representative of the rate at which the UE 202 has changed (e.g., historically, over a rolling time window, etc.) between an IS state and an OOS state. For example, the ping-pong rate may be determined based on the duration of the most recent connected time window in which the UE 202 was connected to a service (e.g., via the BS 106 of FIG. 1). In general, the longer the duration of the connected time window, the lower the ping-pong rate. Once the ping-pong rate is determined, the ping-pong rate-based algorithm selects a starting scan ratio for the UE 202, to be used the next time the UE 202 goes into the OOS state. More specifically, the starting scan ratio to be used during the next OOS state of the UE 202 may be reset to a particular scan ratio of a decreasing sequence of scan ratios used during the previous disconnected time window during which the UE 202 was disconnected from service. The decreasing sequence of scan ratios is a sequence in which each scan ratio is less than (or in some cases, the same) as a previous scan ratio in the sequence. The decreasing sequence of scan ratios generally decreases over the course of the sequence with respect to the scan time represented in each scan ratio. The ping-pong rate may indicate which scan ratio in the sequence of scan ratios the current scan ratio should be set to. For instance, a relatively higher ping-pong rate (indicating rapid loss and reacquisition of service) may cause the UE 202 to continue using the most recently used scan ratio of the sequence as if the most recent service reacquisition did not happen. A medium ping-pong rate may instead cause the scan ratio to be reset to a mid-point of the decreasing sequence of scan ratios used during the last disconnected time window. A relatively lower ping-pong rate (indicating infrequent loss and acquisition of service) may cause the scan ratio to be reset back to the initial scan ratio of the sequence. In this manner, the ping-pong rate-based OOS recovery protocol may allow for efficient reductions in scan ratios when the UE 202 is frequently going in and out of service.

The memory 214 may further store one or more OOS recovery parameters 224. The OOS recovery parameters 224 may include any of, for example, one or more timers or counters for tracking the amount of time during which the UE 202 (or a connected UE) has been in the OOS state, a ping-pong rate, or other applicable parameters. The OOS recovery parameters 224 are used in executing one or more of the OOS recovery protocols 222, as described in the previous examples.

In some embodiments, the UE 202 generates the OOS recovery parameters 224 while scanning for service and sends the OOS recovery parameters 224 to a connected UE (e.g., the second UE 104 of FIG. 1), if any connected UE is present. This allows the connected UE to resume scanning for service based on the actions already taken by the UE 202 while scanning for service.

In some embodiments, the UE 202 receives the OOS recovery parameters 224 from a connected UE (e.g., the first UE 102 of FIG. 1). This allows the UE 202 to resume scanning for service based on the actions already taken by the connected UE while scanning for service.

Figure 3:
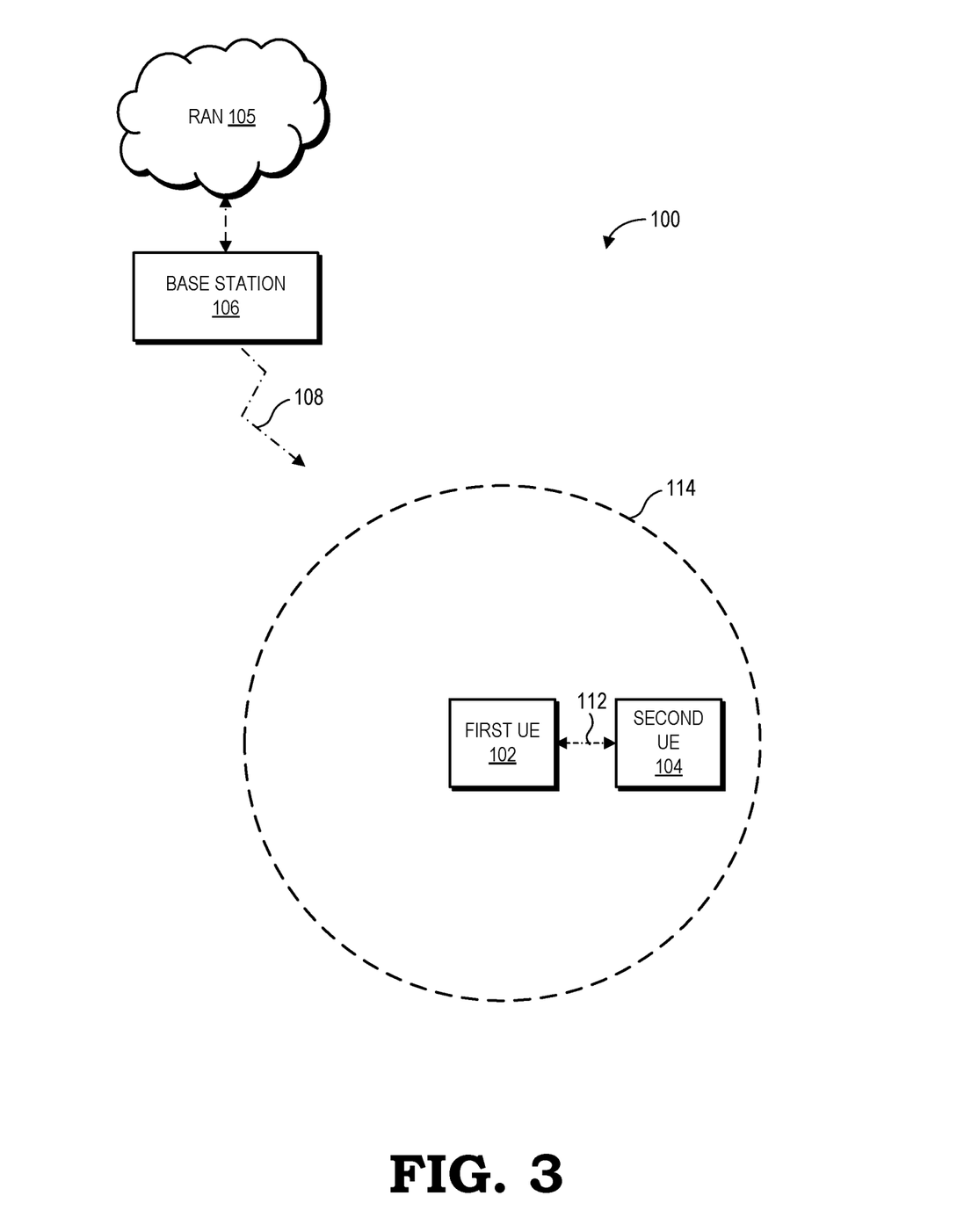
FIG. 3 is a block diagram of an example scenario in which the first UE of the wireless communication network of FIG. 1 is in an OOS state while maintaining a wireless connection with a second UE, in accordance with some embodiments.

FIG. 3 illustrates a block diagram of an example in which the first UE 102 of the wireless communication network 100 is no longer connected to the BS 106 via the wireless network connection 107 of FIG. 1 (or any other BS), the first UE 102 and the second UE 104 are still connected via the WPAN connection 112 (i.e., while the second UE 104 is still tethered to the first UE 102 and is in the tethering mode), and the signal strength of the WPAN connection 112 is not marginal. In the present example, the first UE 102 is in an OOS state. In the OOS state, the first UE 102 scans for service to reestablish the wireless network connection 107 with the BS 106 or to establish a new wireless network connection via another BS. In some embodiments, while in the OOS state, the first UE 102 scans for service from multiple RANs, across multiple corresponding RATs (e.g., any of 3GPP, 4G, LTE, or 5G NR), including the first RAT. In some embodiments, when scanning for service, the first UE 102 performs scans of frequencies stored in an acquisition database (ACQ DB) of the first UE 102 in addition to full band scans on one or more RATs, with scan intervals being defined by one or more OOS recovery protocols (e.g., the OOS recovery protocols 222) executed at the first UE 102. The ACQ DB of the first UE 102 includes information related to frequencies on which the first UE 102 is most likely to find a signal where service may be acquired within each public land mobile network (PLMN) that is accessible by the first UE 102 for each RAT supported by each PLMN. In some embodiments, the ACQ DB includes a list of frequencies that are each associated with a PLMN identifier and a RAT identifier.

In conventional systems, the second UE 104 would typically attempt to find network service using the first RAT upon determining that the first UE 102 is in the OOS state. However, it is generally inefficient for both the first UE 102 and the second UE 104 to scan for service, since using both devices to scan for service only provides a marginal decrease in the delay in reestablishing service (once service is available again), while significantly increasing the power consumption of both the first UE 102 and the second UE 104. In the present example, in order to avoid such inefficiencies, the second UE 104 does not scan for service while connected to the first UE 102 via the WPAN connection 112 (i.e., while the second UE 104 is tethered to the first UE 102 and is in the tethering mode), as long as the strength of the WPAN connection 112 is non-marginal (e.g., for as long as the instantaneous or average signal strength of the WPAN connection 112 remains above a predetermined threshold level). In some embodiments, the second UE 104 disables one or more modems associated with the RATs for which service is being scanned when the first UE is in the OOS state and while the signal strength of the WPAN connection 112 is non-marginal.

The first UE 102 generates OOS recovery parameters (e.g., the OOS recovery parameters 224 of FIG. 2) while in the OOS state. In some embodiments, the first UE 102 uses at least some of the OOS recovery parameters as inputs to one or more OOS recovery protocols (e.g., the OOS recovery protocols 222 of FIG. 2). In some embodiments, the first UE 102 additionally or alternatively sends the OOS recovery parameters to the second UE 104 while the first UE 102 is in the OOS state. In some embodiments, the first UE 102 sends the OOS recovery parameters to the second UE 104 periodically (e.g., at a predetermined rate) while the first UE 102 is in the OOS state.

Because the second UE 104 receives the OOS recovery parameters from the first UE 102, the second UE 104 is able to continue scanning for service where the first UE 102 left off in the event that the second UE 104 becomes disconnected from the first UE 102 (i.e., if the WPAN connection 112 is lost or disabled). For example, if the second UE 104 becomes disconnected from the first UE 102 while the first UE 102 is in the OOS state, then the second UE 104 activates at least one modem (e.g., one or more of the modems 208 of FIG. 2) configured to communicate using the first RAT, then the second UE 104 begins scanning for service according to one or more OOS recovery protocols (e.g., the OOS recovery protocols 222 of FIG. 2). Rather than having to begin scanning for service without any prior information regarding actions that have already been taken by the first UE 102 when scanning for service, the second UE 104 is able to continue scanning for service based on the OOS recovery parameters received from the first UE 102.

For example, the second UE 104 leverages scan patterns that have already been executed by the first UE 102, as indicated in the OOS recovery parameters, such that the second UE 104 continues execution of the OOS recovery protocol(s) as though those scan patterns had already been performed by the second UE 104. In some embodiments, one or more of the OOS recovery protocols (e.g., an incremental sleep algorithm or a ping-pong rate-based OOS recovery protocol of the OOS recovery protocols 222) initially (i.e., in an initial phase) require a UE to scan multiple frequency bands at a relatively high rate, and over time reduce the scan ratio defining a ratio of the scan duration to the sleep duration used when scanning for service. Scanning frequency bands at a relatively higher rate corresponds to higher power consumption. So, by leveraging scan patterns previously performed by the first UE 102 based on the OOS recovery parameters (instead of starting the associated OOS recovery protocol(s) in their initial, high scan ratio phase), the power consumption of the second UE 104 is reduced when attempting to acquire service after disconnecting from the first UE 102.

As another example, the OOS recovery parameters provided by the first UE 102 can include PLMN information acquired during one or more early stages of the OOS recovery protocol executed by the first UE 102, such that the second UE 104 is able to begin scanning for service sooner, rather than having to perform an initial PLMN selection and PLMN search.

Figure 4:
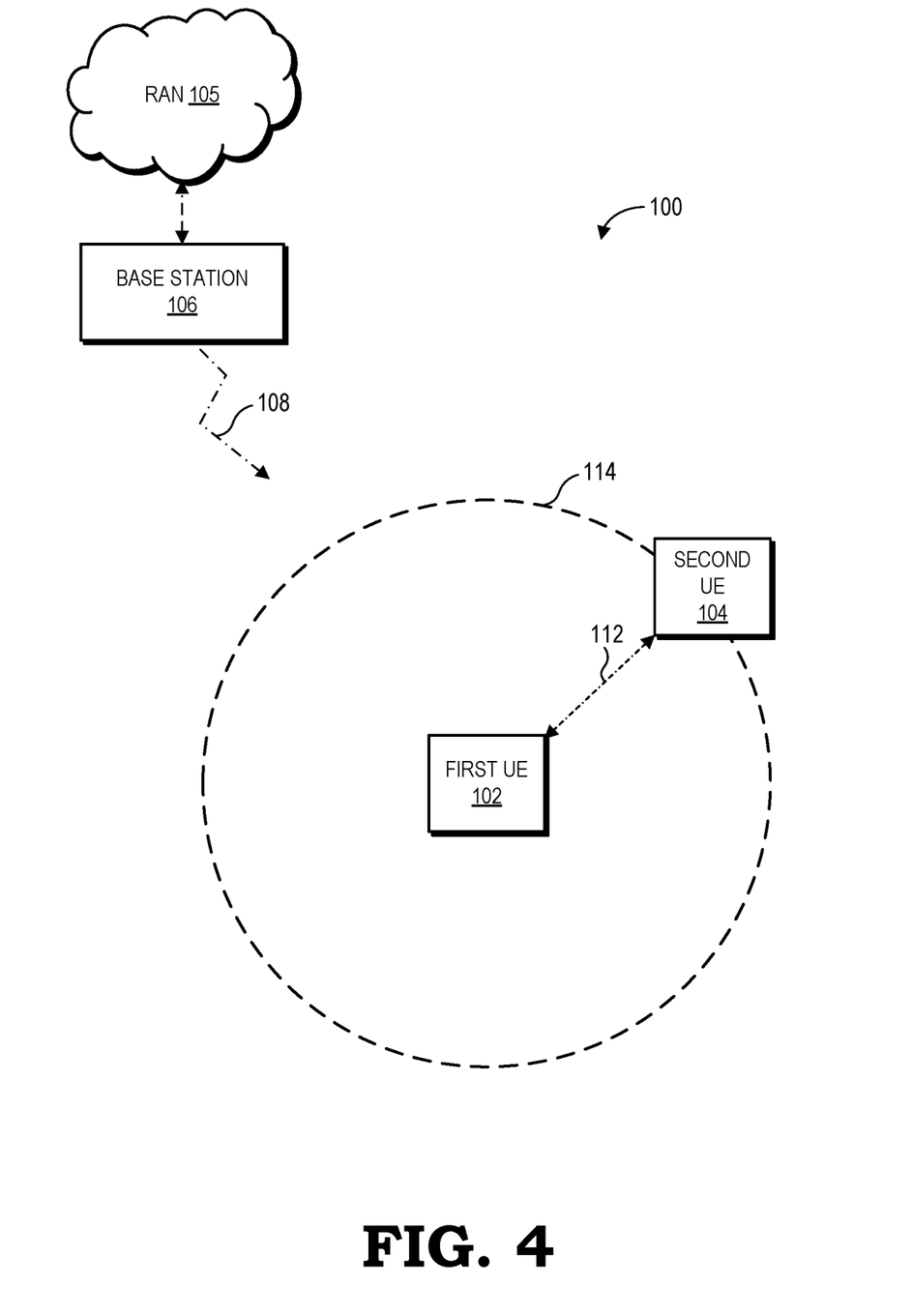
FIG. 4 is a block diagram of an example scenario in which the first UE of the wireless communication network of FIG. 1 is in an OOS state while maintaining a marginal connection with a second UE, in accordance with some embodiments.

FIG. 4 illustrates a block diagram of an example in which the first UE 102 of the wireless communication network 100 is no longer connected to the BS 106 via the wireless network connection 107 of FIG. 1 (or any other BS), and the signal strength of the WPAN connection 112 is marginal (e.g., inconsistent, below a predetermined threshold level, or both) due to the second UE 104 being at or near the boundary 114. In the present example, the first UE 102 is in the OOS state, as described previously.

In response to determining that the signal strength of the WPAN connection 112 is marginal, the second UE 104 activates at least one modem (e.g., one or more of the modems 208 of FIG. 2) configured to communicate using one or more RATs (e.g., including the first RAT), then the second UE 104 begins scanning for service according to one or more OOS recovery protocols (e.g., OOS recovery protocols 222 of FIG. 2).

In some embodiments, the second UE 104 receives OOS recovery parameters (e.g., the OOS recovery parameters 224 of FIG. 2) from the first UE 102 while the first UE 102 is in the OOS state and prior to determining that the signal strength of the WPAN connection 112 is marginal. In such embodiments, rather than having to begin scanning for service without any prior information regarding actions that have already been taken by the first UE 102 when scanning for service, the second UE 104 is able to continue scanning for service based on the OOS recovery parameters received from the first UE 102, as described above. For example, many OOS recovery protocols involve scanning for service more frequently in one or more early stages of the OOS recovery protocol, and scanning for service less frequently in one or more later stages of the OOS recovery protocol. According to various embodiments, the stage of the OOS recovery protocol can be determined based on one or more OOS counter values or OOS timer values of the OOS recovery parameters that indicate the number of scans for service performed or the amount of time spent in the OOS state, or based on OOS recovery protocol state information included in the OOS recovery parameters that indicate the current stage of the OOS recovery protocol. By utilizing prior information, such as the OOS recovery parameters, indicative of actions that have already been taken by the first UE 102 when scanning for service in the OOS state, the second UE 104 may skip the early stages of the OOS recovery protocol to avoid unnecessarily repeating the more frequent scans for service associated with such early stages.

Figure 5:
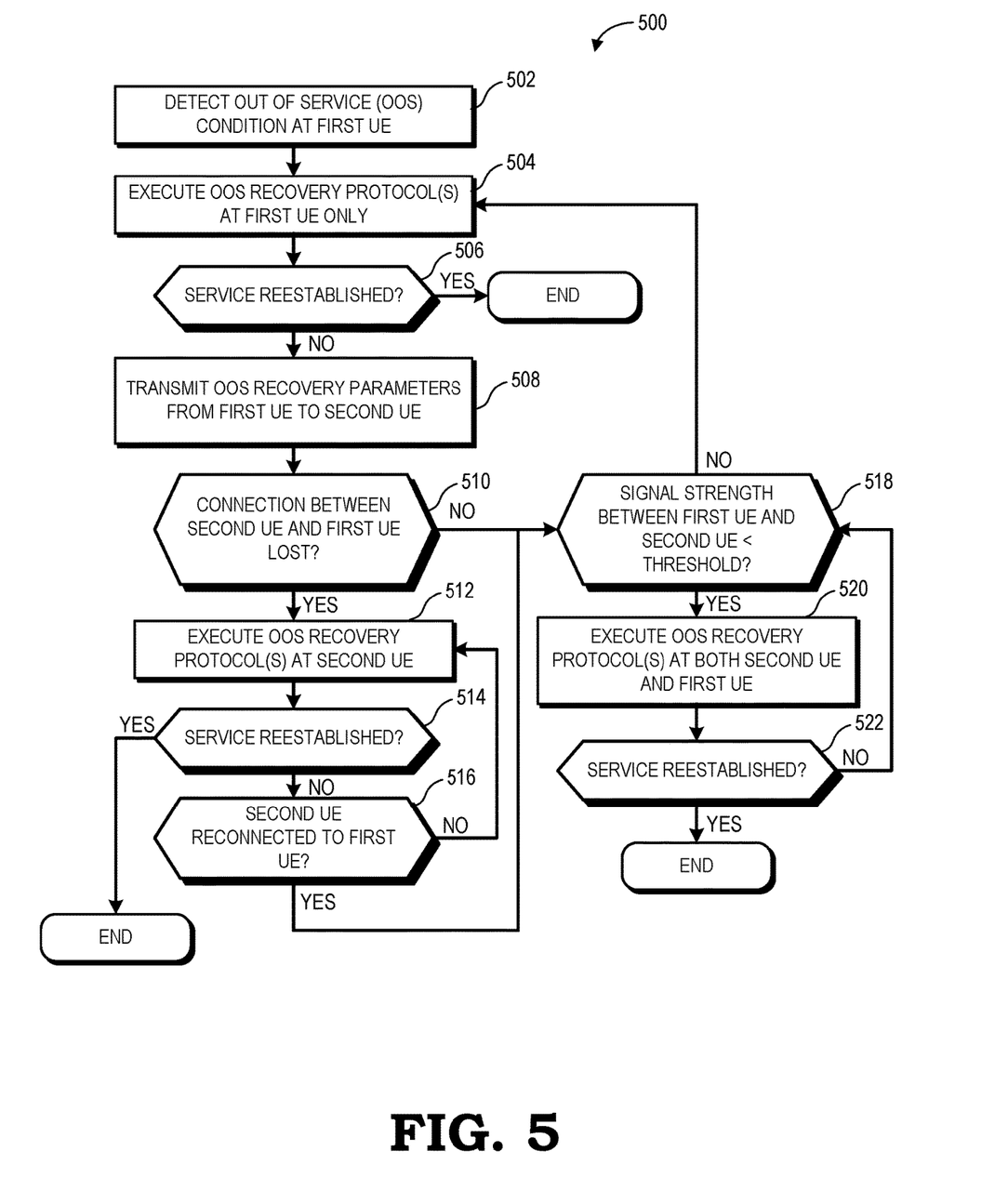
FIG. 5 is a flow chart illustrating a method of reestablishing wireless connectivity with one or more base stations by first and second UEs in an OOS state, where OOS recovery parameters are shared between the first and second UEs, in accordance with some embodiments.

FIG. 5 is a flow diagram of a method 500 of OOS recovery following loss of service via a wireless network connection using a first RAT (e.g., 3GPP, 4G, LTE, or 5G NR) by a first UE, where the first UE and a second UE are initially paired via a WPAN connection. OOS recovery parameters are shared between the first UE and the second UE when the first UE enters the OOS state. The method 500 is implemented in some embodiments of the wireless communication network 100 of FIGS. 1, 3, and 4, and in connection with some embodiments of the UE 202 of FIG. 2. Accordingly, like elements of FIGS. 1-4 are referred to in the present example using like numerals.

At block 502, the first UE 102 detects an OOS condition with respect to the first RAT. For example, the OOS condition is typically triggered by losing a wireless network connection to a BS associated with a RAN, such as the wireless network connection 107 to the BS 106 associated with the RAN 105.

At block 504, responsive to detecting the OOS condition, the first UE 102 executes one or more OOS recovery protocols, such as the OOS recovery protocols 222. In some embodiments, the first UE 102 scans for service across multiple RATs (e.g., any of 3GPP, 4G, LTE, or 5G NR), including the first RAT. In some embodiments, when scanning for service, the first UE 102 performs scans of frequencies stored in an acquisition database (ACQ DB) of the first UE 102 in addition to full band scans on one or more RATs, with scan intervals being defined by the one or more OOS recovery protocols executed at the first UE 102.

The second UE 104 does not automatically attempt to execute the OOS recovery protocols or scan for service, and one or more modems of the second UE 104 that are configured for communicating via the RATs being scanned by the first UE 102 are disabled (e.g., turned off or kept in an idle state). However, in some embodiments, a user may manually enable such modems to cause the second UE 104 to scan for service during block 504.

At block 506, the first UE 102 determines whether service (e.g., via the first RAT or another RAT for which service was scanned at block 504) has been reestablished upon execution of the OOS recovery protocol(s). If the first UE 102 determines that service has been reestablished, the method 500 ends. Otherwise, if the first UE 102 determines that service has not been reestablished, the method 500 proceeds to block 508.

At block 508, while continuing to execute the OOS recovery protocols, the first UE 102 transmits OOS recovery parameters to the second UE 104 (e.g., via the WPAN connection 112). In some embodiments, the first UE 102 transmits the OOS recovery parameters to the second UE 104 periodically (e.g., at a predetermined rate).

At block 510, the second UE 104 determines whether the WPAN connection 112 between the first UE 102 and the second UE 104 has been lost. For example, the WPAN connection 112 between the first UE 102 and the second UE 104 can be lost if the signal strength of the WPAN connection 112 drops to a sufficiently low level (e.g., due to the second UE 104 leaving the wireless range of the first UE 102 with respect to the wireless technology standard used to implement the WPAN connection 112) or if a user manually disables the WPAN communications of either or both of the first UE 102 and the second UE 104. If the second UE 104 determines that the WPAN connection 112 has been lost (i.e., the first UE 102 is no longer connected to the second UE 104), the method proceeds to block 512. Otherwise, if the second UE 104 determines that the WPAN connection 112 has not been lost, the method 500 proceeds to block 518.

At block 512, the second UE 104 activates one or more modems configured for communication via one or more RATs (e.g., including the first RAT) and uses the one or more modems to execute one or more OOS recovery protocols (e.g., the OOS recovery protocols 222). The second UE 104 uses the OOS recovery parameters provided by the first UE 102 as a basis for scanning for service. For example, the second UE 104 may set a scan ratio for scanning for service based on one or more timers or counters or based on a ping-pong rate included in the OOS recovery parameters. In some embodiments, the second UE 104 scans for service across multiple RATs (e.g., any of 3GPP, 4G, LTE, or 5G NR), including the first RAT. In some embodiments, when scanning for service, the second UE 104 performs scans of frequencies stored in an acquisition database (ACQ DB) of the second UE 104 in addition to full band scans on one or more RATs, with scan intervals being defined by the one or more OOS recovery protocols executed at the second UE 104.

It should be understood that the first UE 102 will continue scanning for service in parallel with block 512 (e.g., performing blocks 504 and 506 of the method 500) upon disconnection of the second UE 104, typically until the first UE 102 has successfully regained service.

At block 514, the second UE 104 determines whether service (e.g., via the first RAT or another RAT for which service was scanned at block 512) has been reestablished upon execution of the OOS recovery protocol(s). If the second UE 104 determines that service has been reestablished, the method 500 ends. Otherwise, if the second UE 104 determines that service has not been reestablished, the method 500 proceeds to block 516.

At block 516, if the WPAN connection 112 between the second UE 104 and the first UE 102 is reestablished, the method 500 proceeds to block 518. Otherwise, if the WPAN connection 112 is not reestablished, the method returns to block 512. For example, the WPAN connection 112 can be reestablished due to the second UE 104 reentering the wireless range of the first UE 102 or due to the user reactivating WPAN communications of the first UE 102, the second UE 104, or both.

At block 518, the second UE 104 determines whether the signal strength of the WPAN connection 112 between the first UE 102 and the second UE 104 is less than a predetermined threshold level. For example, the signal strength of the WPAN connection 112 may fall to below the predetermined threshold level (without the WPAN connection 112 being lost entirely) due to an increase in the distance between the first UE 102 and the second UE 104 (e.g., such that the second UE is disposed near the boundary 114, as shown previously in FIG. 4). If the second UE 104 determines that the signal strength of the WPAN connection 112 is less than the predetermined threshold level, the method 500 proceeds to block 520. Otherwise, if the second UE 104 determines that the signal strength of the WPAN connection 112 is at or above the predetermined threshold level, the method 500 returns to block 504.

At block 520, the second UE 104 activates one or more modems configured for communication via one or more RATs (e.g., including the first RAT) and both the first UE 102 and the second UE 104 execute one or more OOS recovery protocols to scan for service. As described above, the second UE 104 uses the OOS recovery parameters provided by the first UE 102 as a basis for scanning for service. It may be beneficial to use both the first UE 102 and the second UE 104 to scan for service in response to determining that the signal strength of the WPAN connection 112 is less than the predetermined threshold level, since such a determination can be predictive of an impending loss of the WPAN connection 112.

At block 522, the second UE 104 determines whether service (e.g., via the first RAT or another RAT for which service was scanned at block 520) has been reestablished upon execution of the OOS recovery protocol(s) by the first UE 102 and the second UE 104. If the second UE 104 determines that service has been reestablished, the method 500 ends. Otherwise, if the second UE 104 determines that service has not been reestablished, the method 500 returns to block 518.

In some embodiments, certain aspects of the techniques described above may be implemented by one or more processors of a processing system executing software. The software comprises one or more sets of executable instructions stored or otherwise tangibly embodied on a non-transitory computer-readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc, magnetic media (e.g., floppy disc, magnetic tape, or magnetic hard drive), volatile memory (e.g., RAM or cache), non-volatile memory (e.g., ROM or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving, from a first user equipment (UE) by a second UE responsive to the first UE entering an out-of-service (OOS) state, at least one OOS recovery parameter via a wireless personal area network (WPAN) connection, the at least one OOS recovery parameter indicating a stage of an ongoing OOS recovery protocol previously executed at the first UE; and
scanning, by the second UE, a plurality of frequency bands for service based on the at least one OOS recovery parameter.

2. The method of claim 1, further comprising:
determining, by the second UE, that a signal strength of the WPAN connection is below a predetermined threshold level, wherein scanning the plurality of frequency bands for service further comprises:
scanning, by the second UE responsive to determining that the signal strength of the WPAN connection is below the predetermined threshold level, the plurality of frequency bands for service based on the at least one OOS recovery parameter, at least a subset of the plurality of frequency bands corresponding to a first radio access technology (RAT).

3. The method of claim 1, further comprising:
determining, by the second UE, that the WPAN connection has been lost, wherein scanning the plurality of frequency bands for service further comprises:
scanning, by the second UE responsive to determining that the WPAN connection has been lost, the plurality of frequency bands for service based on the at least one OOS recovery parameter, at least a subset of the plurality of frequency bands corresponding to a first radio access technology (RAT).

4. The method of claim 1, further comprising:
disabling, by the second UE, communications of the second UE via a first radio access technology (RAT) while the first UE is in an OOS state and while a signal strength of the WPAN connection is above a predetermined threshold level.

5. The method of claim 2, further comprising:
executing, by the second UE, at least one OOS recovery protocol to determine a scan ratio, wherein the scan ratio defines, for a given time period, a scan duration in which the second UE scans for service and a sleep duration in which the second UE does not scan for service.

6. The method of claim 5, wherein the at least one OOS recovery parameter comprises a timer value indicative of a duration of the OOS state of the first UE, and the OOS recovery protocol determines the scan ratio based, at least in part, on the timer value.

7. The method of claim 5, wherein the at least one OOS recovery parameter comprises a ping-pong rate indicative of a rate at which the first UE has changed between the OOS state and an in-service (IS) state, and the OOS recovery protocol determines the scan ratio based, at least in part, on the ping-pong rate.

8. A user equipment (UE) comprising:
at least one modem configured to communicate using at least one radio access technology (RAT); and
at least one processor configured to:
receive at least one out-of-service (OOS) recovery parameter from a device to which the UE is connected, the at least one OOS recovery parameter indicating a stage of an ongoing OOS recovery protocol previously executed at the device to which the UE is connected; and
scan for service using the at least one modem based on the at least one OOS recovery parameter.

9. The UE of claim 8, wherein the at least one processor is further configured to:
activate the at least one modem to scan for service responsive to determining that a signal strength of a connection between the UE and the device is less than a predetermined threshold level.

10. The UE of claim 9, wherein the at least one processor is further configured to:
deactivate the at least one modem responsive to determining that the signal strength is above the predetermined threshold level.

11. The UE of claim 10, wherein the at least one processor is further configured to:
execute at least one OOS recovery protocol to determine a scan ratio, wherein the scan ratio defines, for a given time period, a scan duration in which the UE scans for service using the at least one modem and a sleep duration in which the UE does not scan for service.

12. The UE of claim 11, wherein the at least one OOS recovery parameter comprises a timer value indicative of a duration of an OOS state of the device, and the OOS recovery protocol determines the scan ratio based, at least in part, on the timer value.

13. The UE of claim 11, wherein the at least one OOS recovery parameter comprises a ping-pong rate indicative of a rate at which the device has changed between an OOS state and an in-service (IS) state, and the OOS recovery protocol determines the scan ratio based, at least in part, on the ping-pong rate.

14. A system comprising:
a first user equipment (UE) that is in an out-of-service (OOS) state with respect to a first radio access technology (RAT) and that is configured to output at least one OOS recovery parameter while in the OOS state, the at least one OOS recovery parameter indicating a stage of an ongoing OOS recovery protocol previously executed at the first UE; and
a second UE that is coupled to the first UE via a wireless personal area network (WPAN) connection and that is configured to:
receive the at least one OOS recovery parameter from the first UE; and
scan for service based on the at least one OOS recovery parameter.

15. The system of claim 14, wherein the second UE is configured to activate at least one modem associated with the first RAT to scan for service responsive to determining that a signal strength of the WPAN connection is less than a predetermined threshold level.

16. The system of claim 15, wherein the second UE is configured to deactivate at least one modem associated with the first RAT to scan for service responsive to determining that a signal strength of the WPAN connection is above the predetermined threshold level.

17. The system of claim 14, wherein the second UE is configured to activate at least one modem associated with the first RAT to scan for service responsive to determining that the WPAN connection to the first UE has been lost.

18. The system of claim 14, wherein the second UE is configured to execute at least one OOS recovery protocol to determine a scan ratio, wherein the scan ratio defines, for a given time period, a scan duration in which the second UE scans for service and a sleep duration in which the second UE does not scan for service.

19. The system of claim 18, wherein the at least one OOS recovery parameter comprises at least one of:
a timer value indicative of a duration of the OOS state of the first UE, and the OOS recovery protocol determines the scan ratio based, at least in part, on the timer value, or
a ping-pong rate indicative of a rate at which the first UE has changed between an OOS state and an in-service (IS) state, wherein the OOS recovery protocol determines the scan ratio based, at least in part, on the ping-pong rate.

20. A user equipment (UE) comprising:
at least one modem configured to communicate using at least one radio access technology (RAT); and
at least one processor configured to:
scan for service using the at least one modem responsive to the UE entering an out-of-service (OOS) state; and
transmit, responsive to scanning for service in the OOS state, at least one OOS recovery parameter to a device to which the UE is connected, the at least one OOS recovery parameter indicating a stage of an ongoing OOS recovery protocol previously executed at the UE.

21. The UE of claim 20, wherein the at least one OOS recovery parameter comprises a timer value indicative of a duration of the OOS state of the UE, the at least one processor is further configured to execute an OOS recovery protocol that determines a scan ratio for the UE based, at least in part, on the timer value, and the scan ratio defines, for a given time period, a scan duration in which the UE scans for service using the at least one modem and a sleep duration in which the UE does not scan for service.

22. The UE of claim 20, wherein the at least one OOS recovery parameter comprises a ping-pong rate indicative of a rate at which the UE has changed between the OOS state and an in-service (IS) state, the at least one processor is further configured to execute an OOS recovery protocol that determines a scan ratio for the UE based, at least in part, on the ping-pong rate, and the scan ratio defines, for a given time period, a scan duration in which the UE scans for service using the at least one modem and a sleep duration in which the UE does not scan for service.

23. The method of claim 1, wherein the stage of the ongoing OOS recovery protocol indicated by the at least one OOS recovery parameter is determined based on at least one of:
- one or more counter values indicative of a number of scans for service performed,
- one or more timer values indicative of an amount of time spent in the OOS state, or
- state information explicitly identifying a current stage of the ongoing OOS recovery protocol.

\* \* \* \* \*